(12) United States Patent
Fukushima

(10) Patent No.: US 8,014,259 B2
(45) Date of Patent: Sep. 6, 2011

(54) MULTI LAYER OPTICAL DISC AND OPTICAL DISC APPARATUS CAPABLE OF COPING WITH THE MULTI LAYER OPTICAL DISC

(75) Inventor: Akio Fukushima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 846 days.

(21) Appl. No.: 12/071,593

(22) Filed: Feb. 22, 2008

(65) Prior Publication Data
US 2008/0219142 A1 Sep. 11, 2008

(30) Foreign Application Priority Data

Feb. 22, 2007 (JP) .................................. 2007-041671
Jan. 22, 2008 (JP) .................................. 2008-011060

(51) Int. Cl.
G11B 7/26 (2006.01)
G11B 7/24 (2006.01)
(52) U.S. Cl. ..................................... 369/283; 369/275.1
(58) Field of Classification Search .................. 369/283, 369/275.1, 275.4, 47.1, 53.2, 53.3, 52.1, 369/94, 286
See application file for complete search history.

(56) References Cited

U.S. PATENT DOCUMENTS 7,239,601 B2 * 7/2007 Sato et al. ................... 369/275.3
2003/0076775 A1 4/2003 Sato et al.
2004/0013074 A1 1/2004 Lee et al.

FOREIGN PATENT DOCUMENTS

JP 2005-528726 9/2005
JP 2006-244658 9/2006
WO WO 02/37483 A1 5/2002

OTHER PUBLICATIONS

Mishima, Koji et al. of TDK Corp., "150GB, 6-Layer Write Once Disc for Blu-ray Disk System," Optical Data Storage Topical Meeting 2006, Conference Proceedings, Apr. 23-26, 2006, pp. 123-125.
Japanese Office Action, w/ partial English translation thereof, issued in Japanese Patent Application No. JP 2007-041671 dated Jan. 25, 2011.

* cited by examiner

Primary Examiner — Ali Neyzari
(74) Attorney, Agent, or Firm — McDermott Will & Emery & LLP (57) ABSTRACT

It is an object of the invention to provide a multi layer optical disc that can be used effectively and an optical disc apparatus that can cope with the multi layer optical disc. The object described above can be accomplished by providing redundancy to the number of layers of the multi layer optical disc. The object can also be accomplished by providing reproducing/recording unit of the multi layer optical disc to the optical disc apparatus.

6 Claims, 5 Drawing Sheets

CONTENT OF LAYER INFORMATION RECORDING REGION :
NORMAL LAYER (USE RECOMMENDED/PERMITTED LAYER) : LAYERS 1, 2, 3, 5
DEFECTIVE LAYER (USE NON-RECOMMENDED/NON- PERMITTED LAYER) : LAYER 4

MULTI LAYER OPTICAL DISC AND OPTICAL DISC APPARATUS CAPABLE OF COPING WITH THE MULTI LAYER OPTICAL DISC

INCORPORATION BY REFERENCE

The present application claims priority from Japanese application JP2007-041671 filed on Feb. 22, 2007 and JP2008-011060 filed on Jan. 22, 2008, the content of which is hereby incorporated by reference into this application.

BACKGROUND OF THE INVENTION

This invention relates to a multi layer optical disc and an optical disc apparatus capable of coping with the multi layer optical disc apparatus.

DVD, Blu-ray, HD-DVD, etc, are known as multi layer optical discs. These multi layer optical discs are two layer discs in compliance with standards on which the existing products of the optical discs are based. Studies have been made on four layer and six layer optical discs as described in the non-patent document 1, for example.

JP-A-2006-244658 (hereinafter, the patent document 1) is known as a background art of the invention. This reference describes that "Recording to an optical disc having three or more recording layers is made with stable recording quality".

In this application, the patent document 1 is JP-A-2006-244658 and, the Non-patent Document 1 is "Optical Data Storage Topical Meeting 2006, manuscript TuA3".

SUMMARY OF THE INVENTION

In a case that multi layer optical discs are produced, conventionally, it has been presently to produce the optical discs each having the same number of layers as the number of layers stipulated by a specification and to evaluate quality of each layer after the fabrication of the optical discs. But the optical discs are discarded when the number of layers satisfying a predetermined specification is smaller than the number of layers stipulated by the predetermined specification of the optical discs.

Optical discs having a multi layer construction are generally produced by alternately stacking recording layer and spacer layer between recording layers. Each of the recording layers and the spacer layers is so designed and formed as to achieve desired characteristics but all the layers may not always satisfy the specification stipulated by the standards on which all the layers are based.

Generally, disc characteristics are evaluated in most cases after the production of the optical discs. In this case, it is not possible to know whether or not the discs satisfy the target specification as a whole until the production of the discs is completed. Therefore, even when the first layer fails to satisfy the target specification owing to the problem encountered during its formation, the formation of subsequent layers must be continued because it is not possible to detect this problem of the first layer. Disc performance is measured only after all the layers are formed, and then the existence of defective layers is first found out. In this case, such a disc must be discarded, and the formation process of subsequent layers from the second layer proves useless after formation of the discs.

The patent document 1 and the non-patent document 1 cited above do not at all consider such a problem.

It is an object of the present invention to provide a multi layer optical disc that can be effectively used and an optical disc apparatus capable of coping with such a multi layer optical disc.

The object described above can be accomplished by providing redundancy to the number of layers of a multi layer optical disc. The object can also be accomplished by providing reproducing/recording capability unit of above-mentioned multi layer optical disc to an optical disc apparatus.

The invention can provide a multi layer optical disc that can be effectively used and an optical disc apparatus capable of coping with above-mentioned optical disc.

Other objects, features and advantages of the invention will become apparent from the following description of the embodiments of the invention taken in conjunction with the accompanying drawings.

DETAILED DESCRIPTION OF THE EMBODIMENTS

Preferred embodiments of the invention will be hereinafter explained with reference to the accompanying drawings.

Embodiment 1

Figure 1:
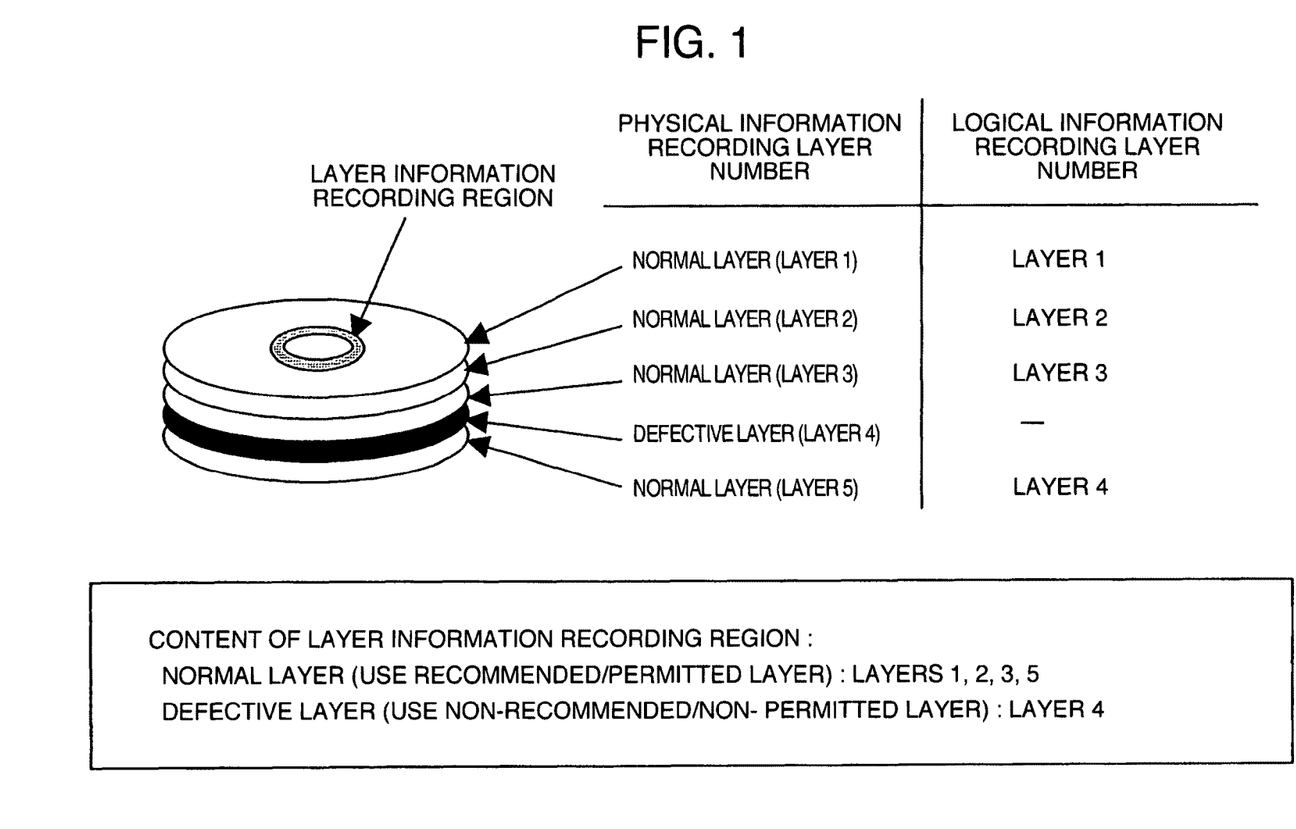
FIG. 1 is a typical view of an optical disc according to a first embodiment.

FIG. 1 shows a first embodiment of the invention and is a typical view of portions having a plurality of information recording layers and layer information recording regions.

The recording layer that satisfies the standard on which the optical disc is based will be hereinafter called an "effective recording layer". Incidentally, the discs according to prior art satisfies the following relation:

number of recording layers existing physically=
number of logical information recording layers=number of information recording layers stipulated by standard However, the present specification includes sometimes the following case:

number of recording layers existing physically≠
number of logical information recording layers, and
number of information recording layers stipulated by standard Explanation will be given on the case where an optical disc having 4 layers as the number stipulated by the standard is produced, by way of example. To produce an optical disc having 4 logical recording layers, an example where an optical disc having physically 5 recording layers will be cited. Incidentally, the number of the physical recording layers is greater than the number of logical recording layers and need not always be 5 layers. For example, it may be 6 or more layers.

To begin with, an optical disc having 5 physical recording layers is produced. Various production processes are employed to produce this optical disc. However, the multi layer disc production process itself is not directly related with this embodiment and explanation will be therefore omitted.

After the optical disc having five recording layers is produced, it measures whether or not each recording layer satisfies desired performance stipulated by the standard on which the optical disc are based. After the measurement is completed, the stipulated value that each layer must satisfy and the measured value are compared for each layer. Thereby the margin of the measured value with respect to the stipulated value is compared. This work is directed to ascertain the quality of each layers and to rank the layers from a larger margin and a higher quality of the layers.

Figure 5:
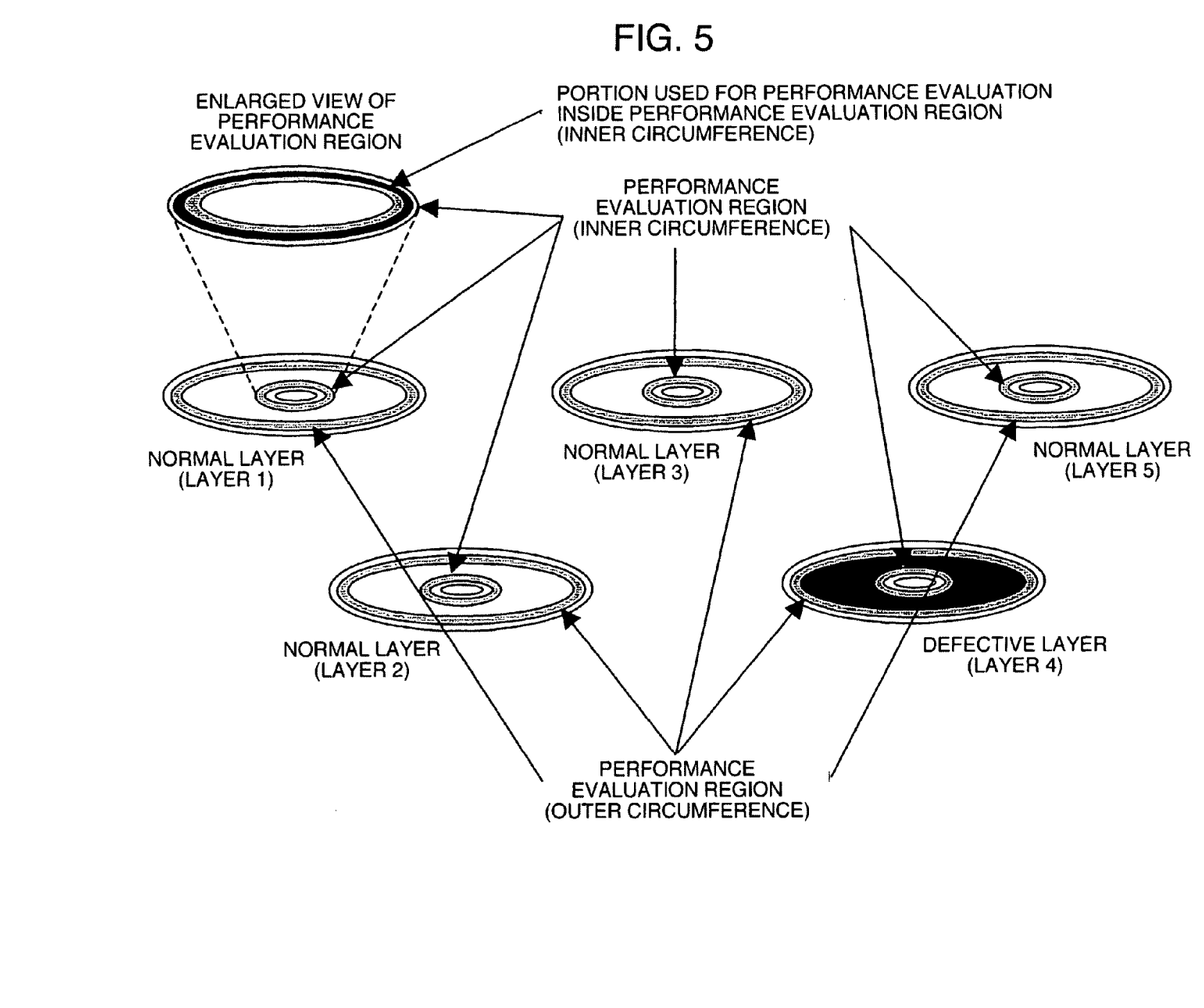
FIG. 5 is a typical view showing an example of an arrangement of disc performance evaluation regions.

Incidentally, it is obvious from the object of claimed invention that a performance evaluation region of the optical disc for measuring and evaluating the performance to be satisfied by each layer exists in all the physical recording layers. The existing position of the performance evaluation region in a radial direction is at least either one, or preferably both, of the inner and outer circumferential sides of the optical disc for the following reason. The performance of the optical disc sometimes varies depending on the position in the radial direction. To improve reliability of the performance evaluation of each layer, therefore, evaluation is preferably made for both inner and outer circumferential sides. FIG. 5 shows an example of the arrangement of the performance evaluation regions in the case mentioned above.

The performance evaluation region need not always be arranged in those regions to and from which the optical disc apparatus can execute write and read operations, and may well be arranged in such readable and writable regions. For example, it is possible to stipulate by the standard in the Blu-ray disc that a part of the region disposed for Optimum Power Control (OPC) or a part of the region disposed as Drive Calibration Zone (DCZ) may be used also for the performance evaluation.

The performance evaluation in this performance evaluation region is carried out, for example, by the steps of recording a predetermined signal to a predetermined area inside the performance evaluation region under at least one predetermined recording condition, reproducing next the recorded signal under at least one predetermined condition, measuring jitter, error rate, signal amplitude, asymmetry, resolution, etc, at the time of reproduction and conducting evaluation from these measurement values by a predetermined method.

The conditions to be stipulated during recording are, for example, recording power, recording waveform and recording strategy. The conditions to be stipulated at the time of reproduction are, for example, reproduction power, high frequency modulation and servo condition.

When ranking of the layers is completed and all the layers of the five recording layers satisfy the standard, four layers having a large margin from the upper order are set as the layers the use of which is recommended or permitted (hereinafter called "usable layers").

When four layers among the five layers satisfy the standard, the four layers satisfying the standard are set as the usable layers.

Incidentally, the construction of the physical recording layer (layer arrangement) and the construction of the logical recording layer (layer arrangement) are generally associated with one another in such a manner that the order of the layer number of the arrangements achieves the same, but this arrangement is not always necessary. For example, the layer number of the logical recording layer may be allocated in the order of the size of the margin by allocating the physical recording layer having the largest margin to the first number of the logical recording layer, and thereafter allocating the physical recording layer having the second largest margin to the next number of the logical recording layer and so on. In this case, since the layer number having a large margin is allocated in the order of the logical recording layers, it is expected that the layer number and recording quality can be generally associated with one another. Therefore, another effect is expected in that the layers can be selectively used from the aspects of necessary recording quality and reliability.

Next, recording layer information, for identifying the physical information recording layer set as the logical information recording layer and the physical information recording layer not set as the logical information recording layer, is recorded to a layer information recording region of the optical disc.

Incidentally, the recording layer information may be those corresponding information which represents the correspondence information between the physical information recording layer and the logical information recording layer.

For example, the following measures can be taken as the recording layer information:

(1) The logical information recording layer number becomes continuous without a missing number when the corresponding physical information recording layer number is linked from the logical information recording layer number. In this case, the usable recording layer number is coincident with the number of the logical information recording layers, so that data processing of the optical disc drive apparatus becomes easy.

(2) When the logical information recording layer is linked from the physical information recording layer number, the position of the logical information recording layer of the optical disc can be easily determined.

(3) It is possible to use only the usable physical information recording layer number as the recording layer information and to link the usable physical information recording layer number with the logical information recording layer number.

(4) It is further possible to use only the non-usable physical information recording layer number as the recording layer information and to link the logical information recording layer in the orders of the usable physical information recording layer-number and the logical information recording layer number that are determined from the physical information recording layer number and the non-usable physical information recording layer number.

When the recording layer information cannot be read out normally for some reason or other, the operation of the optical disc apparatus may be hindered. Because the recording layer information is so arranged as to exist in the region that can be read out by the optical disc apparatus, it is physically possible to conduct recording and erasing to and from this region in a recordable optical disc apparatus. Therefore, when the recording layer information exists in the recordable or erasable region in the optical disc apparatus, the recording layer information is preferably protected logically from the operations of the optical disc apparatus such as recording and erasing that may hinder the normal read-out operation. For this reason, in the standard on which the optical disc of the present invention is based, the recording operation or the erasing operation to or from the region of the recording information should be inhibited and only reproduction should be permitted instead.

Here, the recording layer information may be recorded in the form the optical disc apparatus can read out. For example, the recording layer information can be recorded in a predetermined format to the information recording area known as "Burst Cutting Area" (hereinafter abbreviated as "BCA"). In this way, the possibility that a user accidentally erases the recording layer information can be reduced while compatibility with the existing optical disc apparatuses is secured.

When the recording layer information is recorded to the layer closest to the optical beam incidence surface of the optical disc, focusing to the layer which recording layer information is recorded can be quickly processed and the processing time for reproduction can be reduced.

When the recording layer information is recorded to the layer farthest from the optical beam incidence surface of the optical disc, this layer need not transmit the laser beam unlike other recording layers. Therefore, flexibility of design of the recording layer is high and better reproduction signals can be generally obtained more easily than other recording layer. The effect that reliability of the recording layer information is improved can thus be acquired.

When the recording layer information is recorded to all the layers, the recording layer information can be quickly acquired in whichever layer the current readout layer may exist.

Figure 3:
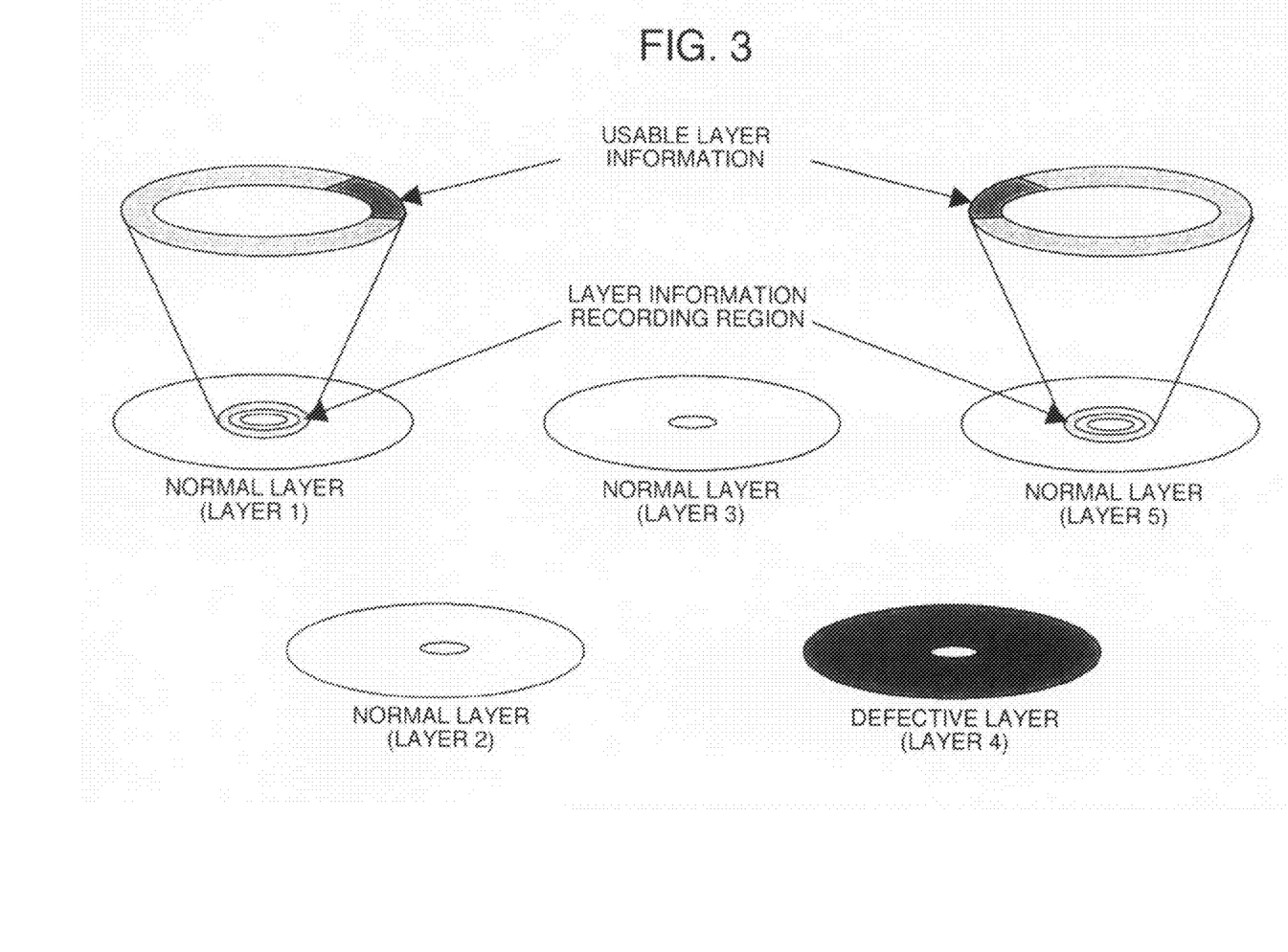
FIG. 3 is a typical view of an arrangement of layer information recording regions and usable layer information of the optical disc according to the first embodiment.

For example, FIG. 3 shows the case where the recording layer information exists in the two layers, i.e. the layer closest to the optical beam incidence surface of the optical disc and the layer farthest from the optical beam incidence surface. The same usable recording layer information is recorded to the region for recording the usable layer information existing in the layer information recording regions of the layer 1 and the layer 5, respectively. Since a plurality of usable layer information exists in this case, it is only necessary that the usable layer information of either of the usable layer information is correctly reproduced. Therefore, even when either one of the usable layer information cannot be correctly read owing to defects or scratches of the disc, a necessary processing can be executed by using the usable layer information that can be normally reproduced.
Reliability can thus be improved.

The recording layer information may well be recorded in the form that the optical disc apparatus corresponding to the multi layer optical disc can read out. For example, the recording layer information may be recorded in a predetermined format into the information recording area for recording identification information (hereinafter abbreviated as "ID information") inherent to the optical disc.

Figure 4:
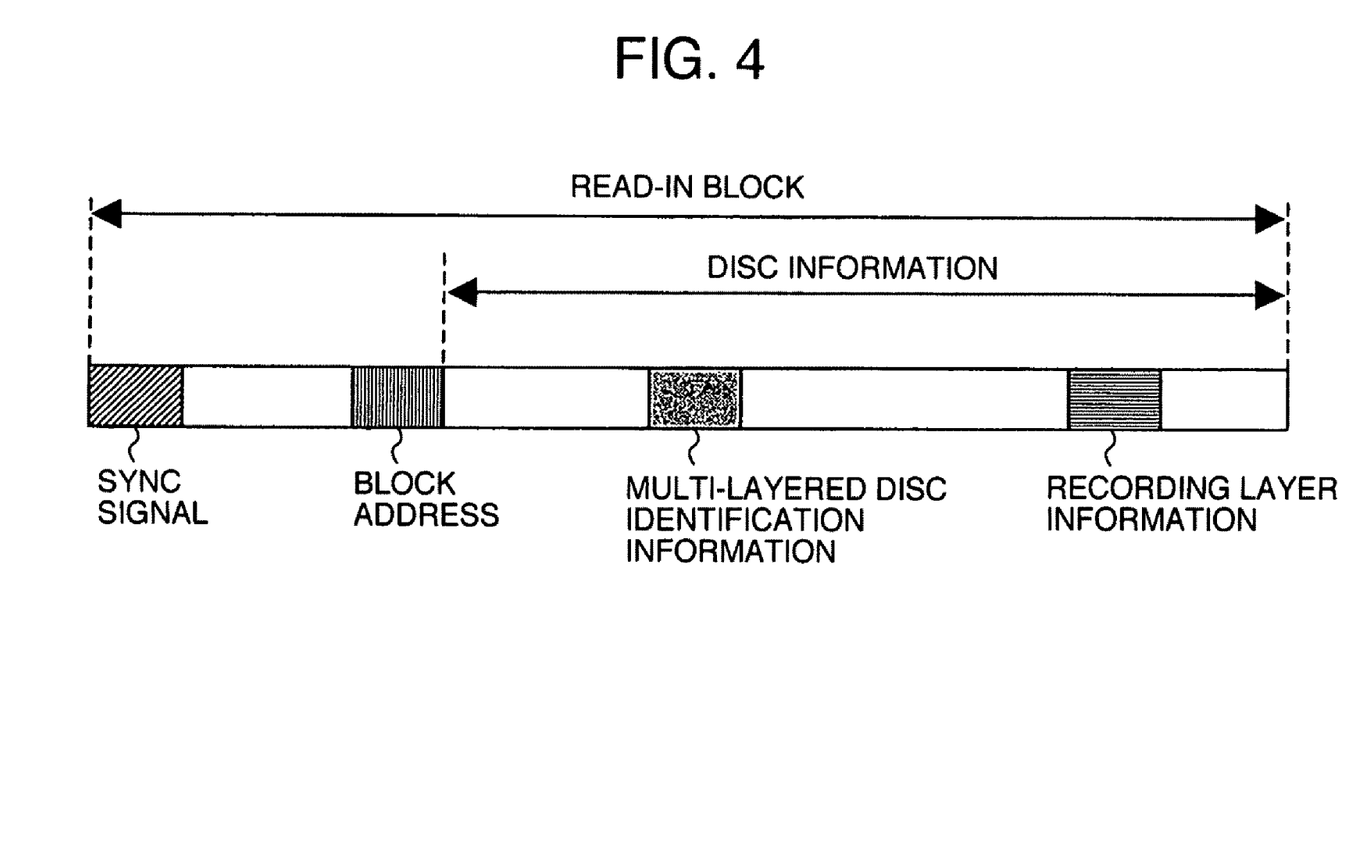
FIG. 4 is a typical view showing an example of a storing method of recording layer information.

FIG. 4 is a typical view showing an example of a storing method of the recording layer information. The recording layer information is stored in a portion containing disc information in a read-in block. Information representing that the optical disc is a multi layer disc, and the information is stored in the portion containing the disc information, too.

In this way, the redundancy is provided with the layer number of the multi layer optical disc. Thereby the optical disc can satisfy the standard as a whole even when one or more layers fail to satisfy the specification stipulated by the standard on which the optical disc is based. Because the optical disc can thus be handled as the approved product, it need not be discarded. An environmental load resulting from the discard of the defective products can be reduced, too. Even if optical discs have defective layer(s), a disc maker can specify the guaranteed layer number since the maker can judge as usable for such optical discs containing the defective layer(s). Further, the maker can selectively set the prices of the products in accordance with the number of usable layers, for example.

Embodiment 2

Figure 2:
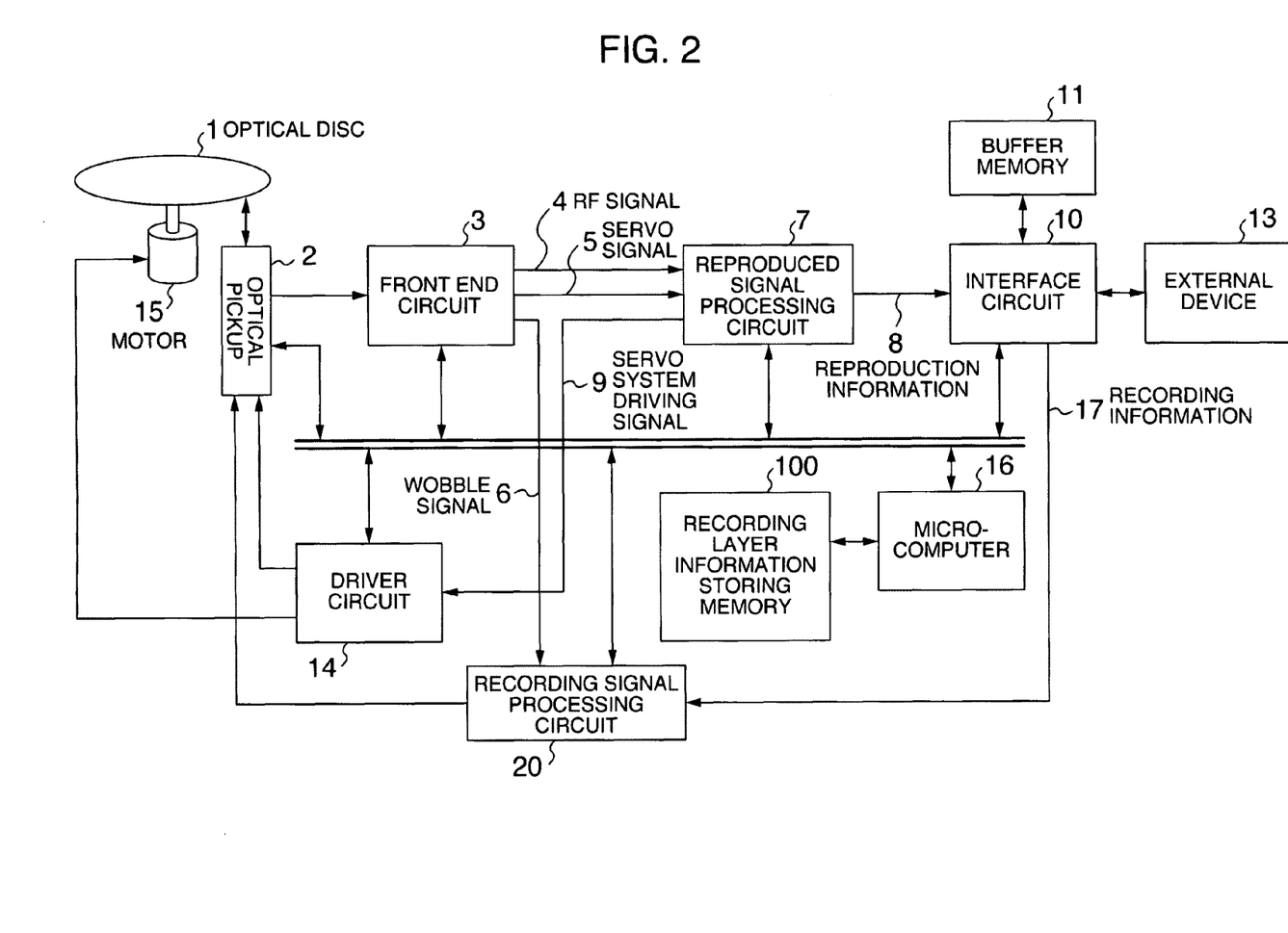
FIG. 2 is a block diagram of an optical disc apparatus according to a second embodiment.

FIG. 2 shows the second embodiment and is a block diagram of an optical disc apparatus capable of coping with the disc of the embodiment 1.

First, the case where information is recorded to the optical disc will be explained.

A signal detected from the optical disc 1 by using an optical pickup 2 is inputted to a front end circuit 3. An analog signal processing is mainly executed in the front end circuit 3 and a servo signal 5 and a wobble signal 6 are generated. The servo signal 5 outputted from the front end circuit 3 is inputted to a reproduction system signal processing circuit 7. A digital signal processing is mainly executed in the reproduction system signal processing circuit 7 and a servo system driving signal 9 is generated. The servo driving signal 9 is inputted to a driver circuit 14. The driver circuit 14 conducts power amplification and drives an actuator (not shown in the drawing) inside the optical pickup 2, a motor (not shown) for moving the optical pickup as a whole and a motor 15 for rotating the optical disc 1. The wobble signal 6 is inputted to a recording system signal processing circuit 20. Address detection and recording clock generation are executed by a digital signal processing in the recording system signal processing circuit 20 and are used when information is recorded. The recording information 17 is inputted from an external device 13 to an interface circuit 10 through an interface signal 12. The interface circuit 10 executes a buffering processing of data by using a buffer memory 11 connected thereto and inputs the recording information 17 to the recording system signal processing circuit 20.

To record information to the optical disc, the identification information or the correspondence information between the physical recording layer and the logical recording layer recorded to the optical disc 1 (hereinafter called "usable layer information") is first read out. Since the usable layer information exists in the BCA information and the ID information in this embodiment, these kinds of information are detected by using the optical pickup 2. Next, a necessary processing is executed for these kinds of information by the reproduction system signal processing circuit 7 or the recording system signal processing circuit 20 to reproduce the usable layer information. The usable layer information so reproduced is sent to recording control program software or operating system software having a recording control function that operates on a host PC and is stored in a recording layer information storing memory 100 via a microcomputer 16. The physical information recording layer used for recording is determined in accordance with the instruction of the recording control software. The information corresponding to the physical information recording layer determined as the recording object is sent to an optical disc recording/reproducing apparatus. In the optical disc recording/reproducing apparatus, an inter-layer access processing is first executed, whenever necessary, for the physical information recording layer as the recording object on the basis of the information sent. Next, an intra-layer access processing is executed for the OPC area in the physical information recording layer as the recording object and a processing such as trial write is made to determine recording power. After optimal recording power is decided, the intra-layer access processing is then executed and access is made to an address ahead by a predetermined quantity from a desired recording start address to wait for detection of the target recording start address. When the target recording start address is detected, information recording is started to the physical information recording layer of the optical disc 1.

Next, the case where information is reproduced from the optical disc will be explained.

The signal detected from the optical disc 1 by using the optical pickup 2 is inputted to the front end circuit 3. The analog signal processing is mainly executed in the front end circuit 3 and an RF signal 4 and a servo signal 5 are generated and outputted from the front end circuit 3. These signals from the front end circuit 3 are inputted to the reproduction system signal processing circuit 7. The digital signal processing is mainly executed in the reproduction system signal processing circuit 7 and the reproduction information 8 and the servo system driving signal 9 are generated. The reproduction signal 8 is inputted to the interface circuit 10. The interface circuit 10 executes the buffering processing of data by using the buffer memory 11 connected thereto and outputs the information to the external device 13 through the interface signal 12. On the other hand, the servo system driving signal 9 is inputted to the driver circuit 14. The driver circuit 14 conducts power amplification and drives the actuator (not shown in the drawing) inside the optical pickup 2, the motor (not shown) for moving the optical pickup as a whole and the motor 15 for rotating the optical disc 1.

When the information is reproduced from the optical disc, too, the BCA information and the ID information recorded to the disc are first detected by using the optical pickup 2. Next, a necessary processing is executed for these kinds of information by the reproduction system signal processing circuit 7 or the recording system signal processing circuit 20 to reproduce the usable layer information. The usable layer information so reproduced is sent to the reproduction control program software or the operating system software having a reproduction control function that operates on a host PC and is stored in the recording layer information storing memory 100. The physical information recording layer used for reproduction is determined in accordance with the instruction of the recording control software. The information corresponding to the physical information recording layer determined as the reproducing object is sent to the optical disc recording/reproducing apparatus. In the optical disc recording/reproducing apparatus, the inter-layer access processing is first executed for the physical information recording layer as the reproducing object on the basis of the information received. Next, the intra-layer access processing is executed and access is made to an address ahead by a predetermined quantity from a desired reproducing start address. Since the trial write processing for determining write power in the recording operation is not necessary in the case of the reproduction processing, the sequence of the inter-layer access processing and the intra-layer access processing may well be changed. When the target reproduction start address is reached, information reproduction is started from the physical information recording layer of the optical disc 1.

In the recording and reproduction of the information in the practical optical disc apparatus, various processing and circuits such as tilt servo, spherical aberration correction, access, RF signal demodulation, error detection/correction, and so forth, operate in combination with one another but explanation will be hereby omitted because they are not directly relevant to the gist of the invention.

Next, the third embodiment of the invention will be explained. It will be assumed hereby that the maximum value of the logical information recording layer in the standard on which the optical disc is based is Nmax, the value of the logical information layers that can be taken is N, the value of the recording layers that physically exist is M and N is not greater the Nmax and is a natural number greater than L (where L, M and N are natural numbers).

First, the optical disc is produced with M=Nmax.

When all the recording layers are found satisfying the specification as a result of evaluation of the disc performance, necessary management information is set as an optical disc having M (=Nmax=N) layers because N=M in this optical disc. When one of the recording layers fails to satisfy the specification, this optical disc has N=M−1 and necessary management information is set as an optical disc having the (M−1) layers. Similarly, since N can take the value of up to L, or N=L, an optical disc having N physical recording layers is produced. When the value of the recording layers satisfying the specification is found to be at least L as a result of performance evaluation, this disc can be used as an optical disc having N layers.

When at least one recording layer not satisfying the specification exists in the optical disc having M physical recording layers, it has been generally necessary in the past to discard such an optical disc but according to this embodiment, such an optical disc can be used as the optical disc having the N layers and can be circulated without discarding it provided that N is equal to or greater than L. Therefore, the invention can reduce the waste during the production of the optical discs, can improve the production yield and can reduce the cost of production.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disk including a plurality of information recording layers, comprising:
    a plurality of physical information recording layers, the number of the physical information recording layers being greater than the number of logical information recording layers stipulated by a standard on which the optical disk is based,
    wherein recording layer information indicates whether each of the physical information recording layers is usable or not;
    wherein the recording layer information indicates that a physical information recording layer, which meets a predetermined quality standard, corresponds to one of the logical information recording layers;
    wherein the recording layer information is in all of the logical information recording layers of the optical disk; and
    wherein the optical disk is configured to record information into any of the logical information recording layers or reproduce information from any of the logical information recording layers.

2. An optical disk including a plurality of information recording layers, comprising:
    a plurality of physical information recording layers, the number of the physical information recording layers being greater than the number of logical information recording layers stipulated by a standard on which the optical disk is based,
    wherein recording layer information indicates whether each of the physical information recording layers is usable or not;
    wherein the recording layer information indicates that a physical information recording layer, which meets a predetermined quality standard, corresponds to one of the logical information recording layers;
    wherein the recording layer information is in a Burst Cutting Area (BCA) of the optical disk; and
    wherein the optical disk is configured to record information into any of the logical information recording layers or reproduce information from any of the logical information recording layers.

3. An optical disk including a plurality of information recording layers, comprising:
- a plurality of physical information recording layers, the number of the physical information recording layers being greater than the number of logical information recording layers stipulated by a standard on which the optical disk is based,
- wherein recording layer information indicates whether each of the physical information recording layers is usable or not;
- wherein the recording layer information indicates that a physical information recording layer, which meets a predetermined quality standard, corresponds to one of the logical information recording layers;
- wherein the physical information recording layers are ranked according to a better quality thereof, and the recording layer information indicates the physical information recording layers correspond to the logical information recording layers in order of the ranked physical information recording layers; and
- wherein the optical disk is configured to record information into any of the logical information recording layers or reproduce information from any of the logical information recording layers.

4. The optical disk including a plurality of information recording layers, according to claim 3,
- wherein the recording layer information is in all of the logical information recording layers of the optical disk.

5. The optical disk including a plurality of information recording layers, according to claim 3,
- wherein the recording layer information is in a Burst Cutting Area (BCA) of the optical disk.

6. An optical disk apparatus capable of loading thereto an optical disk having a plurality of physical recording layers, wherein the optical disk has a plurality of physical information recording layers and the number of the physical information recording layers is greater than the number of logical information recording layers stipulated by a standard on which the optical disk is based, and the optical disk has recording layer information as to whether each of the physical information recording layers is usable or not,
said optical disk apparatus, comprising:
- a writing unit which writes information into the optical disk;
- a reading unit which reads out information from the optical disk;
- a memory which stores the information read out by the reading unit; and
- a control unit which controls the writing unit and the reading unit;
- wherein the control unit reads out the recording layer information from the optical disk by the reading unit, stores the recording layer information to the memory and controls the writing unit and the reading unit on the basis of the recording layer information stored in the memory.

* * * * *